(No Model.)
A. L. SWIFT.
OIL CUP.
No. 328,907. Patented Oct. 20, 1885.
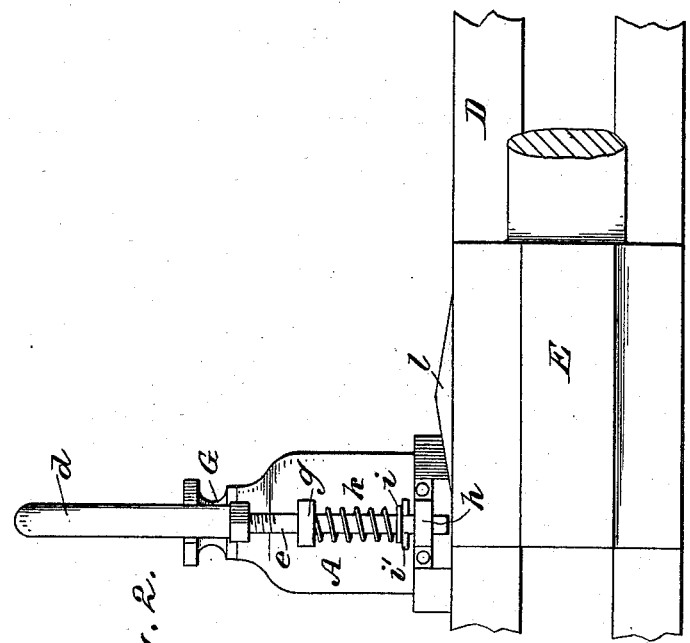
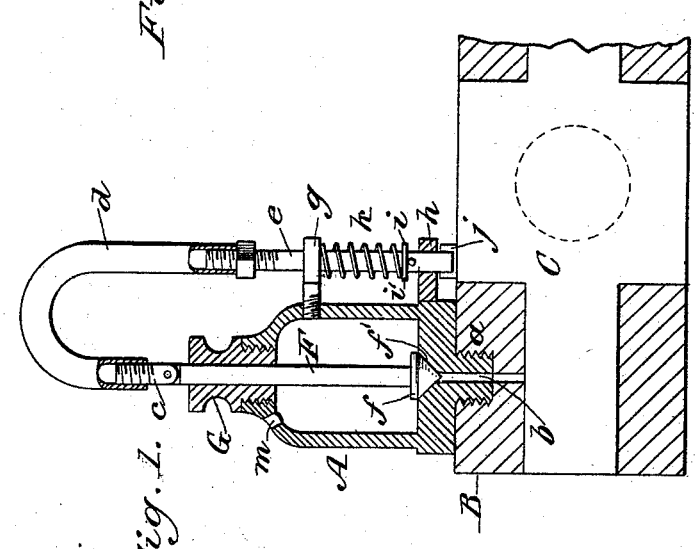
WITNESSES:
INVENTOR:
A. L. Swift
BY Munn & Co.
ATTORNEYS.

UNITED STATES PATENT OFFICE.

ALBERT L. SWIFT, OF LEAVENWORTH, KANSAS.

OIL-CUP.

SPECIFICATION forming part of Letters Patent No. 328,907, dated October 20, 1885.

Application filed March 25, 1885. Serial No. 160,060. (No model.)

*To all whom it may concern:*

Be it known that I, ALBERT L. SWIFT, of Leavenworth, in the county of Leavenworth and State of Kansas, have invented a new and Improved Oil-Cup, of which the following is a full, clear, and exact description.

This invention relates to self-feeding oil-cups and to that class wherein the spindle may be adjusted for regulating the flow of oil. The object of the invention is to provide an oil-cup of this class of cheap, simplified, and durable construction; and the invention consists of a bow-connection between the spindle and the rod that carries the spring, the spindle and rod being adjustably and detachably connected to the ends of the bow, the latter directly by a screw-thread, the former by means of a screw-threaded link that prevents any lateral movement or jar of the rod and bow from being communicated to the spindle.

Reference is to be had to the accompanying drawings, forming part of this specification, in which similar letters of reference indicate corresponding parts in both the figures.

Figure 1 is a sectional elevation showing my invention applied to a shaft or axle, and Fig. 2 is a side view showing the cup applied for oiling a sliding cross-head.

A represents the oil-reservoir, formed with screw-threaded shank $a$, by which it may be secured to the bearing B for oiling the shaft or axle C, or to the bar D for oiling the cross-head E. The orifice $b$, through which the oil passes from the reservoir A, is adapted to be closed by the spindle F, which is by preference formed at its lower end with the conical head $f$, that fits in a countersink, $f'$, formed about the orifice $b$. The stem F in this instance passes up through the screw-plug G, fitted at the top of the reservoir A, and to its upper end is connected, by the screw-threaded connecting-link $c$, the curved rod or pipe $d$, which is screw threaded to receive the screw-threaded link $c$. To the opposite end of the curved rod or tube $d$ is attached, by screw-threads or otherwise, the rod $e$, which is held loosely in the keepers $g\ h$, and is of such length relative to the length of the spindle F as to reach nearly to the axle C or cross-head E. Upon the rod $e$ is placed the coiled spring $k$, which acts between the under surface of the keeper $g$ and the washer $i$, held in place by the pin $i'$ passed through the rod $e$, so that the spring acts constantly to force rod $e$, curved rod $d$, and spindle F downward, so that the head $f$ of the spindle will normally close the outlet-orifice $b$ and prevent the passage of oil from the reservoir A to the bearing to be oiled. Upon the shaft or axle C, in line with the rod $e$, I form or secure the small cam $j$, that serves to lift the rod $e$, curved pipe $d$, and spindle F once for every revolution of the shaft or axle C, permitting small supplies of oil to pass from the reservoir to the bearing. Upon the cross-head E, in line with the rod $e$, I form or secure the small cam $l$, that serves as the cross-head is reciprocated to lift rod $e$ and its connections, to permit the escape of oil from the reservoir A.

An orifice, $m$, is made in the reservoir A for filling it; and it will be understood that although I have shown the reservoir A closed at the top that the invention is applicable to open as well as closed oil-cups.

By constructing the oil-cup as described it will be seen that there will be a regular feed of oil while the machinery is in motion, and no drip or loss of oil while the machinery is not in motion; consequently there will be great saving of oil. The reciprocating motion of the spindle F keeps the oil from hardening in cold weather, and very heavy oil may be used, as the head $f$ will force the oil through the orifice $b$, which action is facilitated by the countersink $f'$. By means of the screw-connection or link $c$ or screw-rod $e$ the spindle F may be raised or lowered to regulate the amount of oil fed to the bearing at each movement of the spindle F, and by means of the link $c$ any jar or lateral movement of the rod $e$ and bow $d$ due to the action of the cam, cross-head or shaft and cam will not be communicated to the spindle, which avoids friction and wear and increases the durability of the cup.

Instead of placing the spring $k$ upon the rod $e$ it may be placed upon the spindle F inside of the oil-reservoir, and effect the same result.

Having thus described my invention, what I claim as new, and desire to secure by Letters Patent, is—

The spindle F, fitted in the oil-reservoir and connected by the adjustable link $c$ to the bow $d$, in combination with the rod $e$, adjustably connected to the other end of the bow $d$ and having the spring $k$ placed thereon, the rod $e$ being held in keepers $g\ h$, substantially as described.

ALBERT L. SWIFT.

Witnesses:
JOHN E. DIPPEL,
JAMES HOWARD.